United States Patent Office

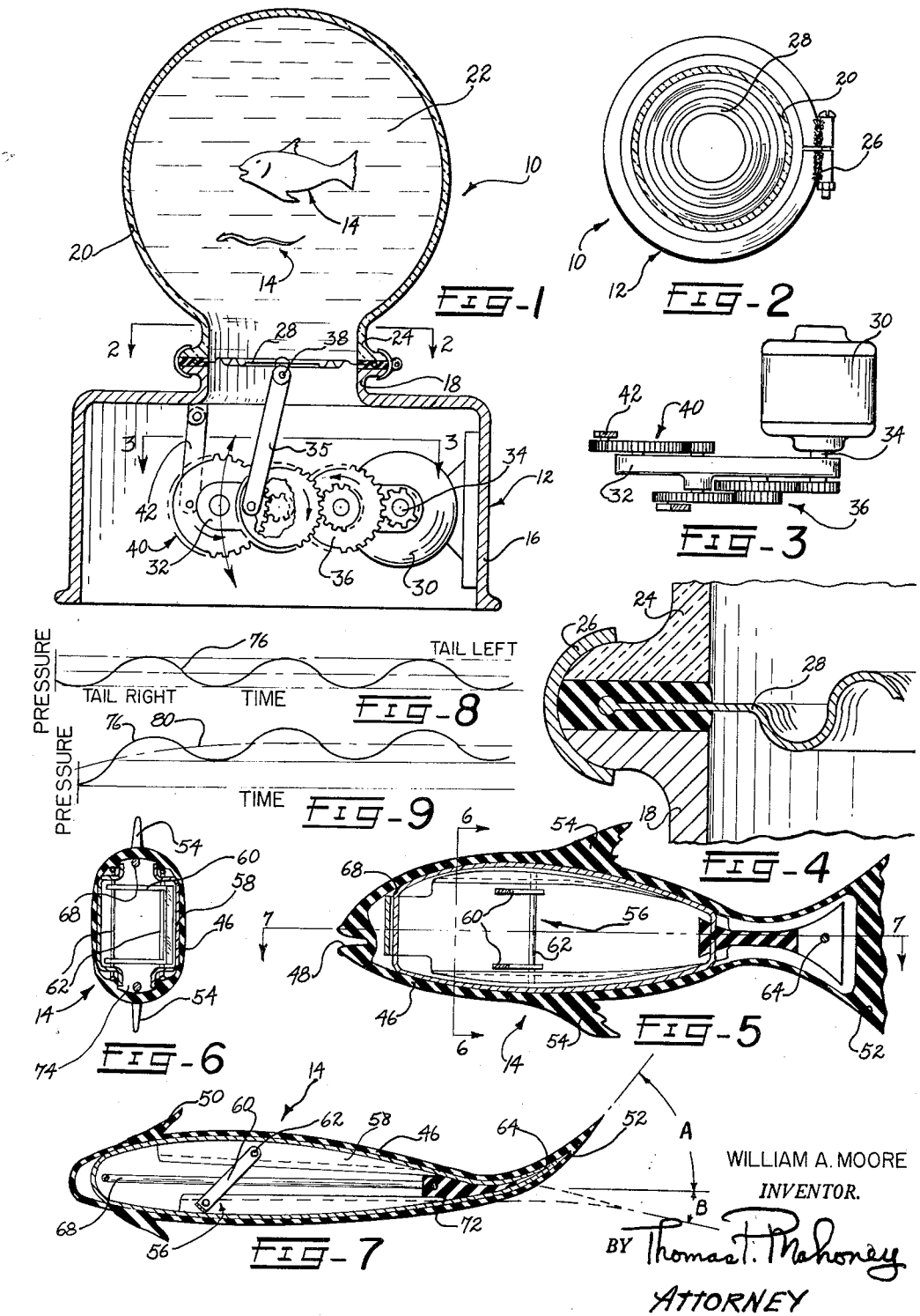

3,071,375
Patented Jan. 1, 1963

3,071,375
APPARATUS FOR PROPULSION OF SUBMERSIBLE OBJECTS
William A. Moore, 910 Greentree Road,
Pacific Palisades, Calif.
Filed Sept. 29, 1958, Ser. No. 764,142
2 Claims. (Cl. 272—8)

This invention relates to an apparatus for the propulsion of submersible objects and to the submersible objects so propelled and has particular application in the form of simulated aquariums.

The principle of the Cartesian diver is well known to those skilled in the art and in such coventional apparatus a compressible body is submerged in a body of liquid and pressure applied to the body of liquid whereby the submerged body will gradually move downwardly in the body of liquid until it reaches the bottom of the enclosure in which the liquid is contained. There have been numerous variants on the Cartesian diver principle, but all of them are based upon the essential concept of moving a compressible body up and down in an enclosed body of liquid.

While in the ensuing disclosure I will describe my invention as applied in simulating various types of aquatic life in aquarium-like containers, it is, of course, to be understood that the principles of the invention need not be limited to such specific applications and various types of embodiments of the invention will occur to those skilled in the art.

It is, therefore, an object of my invention to provide an apparatus whereby submerged bodies are propelled through a liquid in which they are contained and wherein the submerged bodies include at least one propulsive appendage adapted to cause the lineal movement of the submerged bodies through the liquid.

Another object of my invention is the provision of a submerged body of the aforementioned character shaped in the form of a fish or other denizen of the deep and having a propulsive appendage constituted by a tail which is incorporated in a compressible body subject to deflection by pressure waves transmitted through the liquid.

Another object of my invention is the provision of a submersible body of the aforementioned character wherein there is incorporated an actuator responsive to pressure variations in the liquid in which the body is submerged, said actuator being connected to the propulsive tail or other propulsive appendage of the body in order that the body may move through the liquid in which it is submerged in a startlingly life-like and free manner.

A further object of my invention is the provision of a propelling apparatus for submerged bodies of the aforementioned character which includes a receptacle for the liquid in which the bodies are submerged and pressure wave generating means adapted to create two series of pressure waves in the aforementioned liquid; a first, relatively rapid series of sinusoidal pressure waves which serve as propulsion pressure waves adapted to cause the energization of the actuator within the body of the submerged object and thus to propel the body of said submerged object in a substantially lineal pattern; a second series of relatively slow sinusoidal pressure waves adapted to cause vertical movement of the submerged object during its lineal movement, said second series of pressure waves being arbitrarily designated as vertical pressure waves and being superimposed upon the propulsive pressure waves in a manner to be described in greater detail below.

Another object of my invention is the provision of a method of propelling a submerged object through an enclosed body of liquid which involves, generally, the steps of subjecting said liquid to two different series of pressure waves, a first propulsive series and a second height controlling series whereby the submerged body of the object is both lineally and vertically propelled through the liquid in which it is submerged.

Other objects and advantages of the invention will be apparent from the following specification and the accompanying drawing which is for the purpose of illustration only and in which:

FIG. 1 is a vertical, sectional view showing the entire submerged object propelling apparatus;

FIG. 2 is a transverse, sectional view taken on the broken line 2—2 of FIG. 1;

FIG. 3 is a transverse, sectional view taken from the broken line 3—3 of FIG. 1;

FIG. 4 is an enlarged, fragmentary detail;

FIG. 5 is a longitudinal, sectional view of a typical submerged object constructed in accordance with the teachings of the invention;

FIG. 6 is a vertical, sectional view taken on the broken line 6—6 of FIG. 5;

FIG. 7 is a longitudinal, sectional view taken on the broken line 7—7 of FIG. 5;

FIG. 8 is a diagram showing the manner in which the sinusoidal propulsion pressure wave is generated; and FIG. 9 is a diagram showing the manner in which the vertical pressure wave is superimposed upon the propulsion pressure wave to cause vertical movement of a submerged object within the body of liquid in which it is located.

Referring to the drawing and particularly to FIGS. 1–3 thereof, I show an apparatus 10 for the propulsion of submerged objects, said apparatus including, generally, a propulsion apparatus 12 and the submerged object 14 adapted to be propelled thereby. In the particular embodiment of the invention under discussion at present, the propulsion apparatus is in the form of an aquarium and the submerged objects 14 are in the shape and form of various denizens of the deep such as fish and the like. However, it will be apparent to those skilled in the art that the principles and teachings of the invention can be applied with equal cogency to other objects than denizens of the deep and to the representation of other devices than aquariums.

The propulsion apparatus 12 includes a housing 16 incorporating a mount 18 upon which is supported a substantially spherical receptacle 20 which is formed from transparent material such as glass, plastic, or the like adapted to resist pressures to which a body of liquid 22 is subjected.

The tubular neck 24 of the receptacle 20 is secured to the mounting means by means of a clamp 26 and a diaphragm 28 is interposed between the base of the neck 24 and the upper extremity of the mount 18.

Secured within the housing 16 is an electric motor 30, said electric motor having an elongated carriage or arm 32 pivotally mounted in encompassing relationship with the drive shaft 34 thereof. The motor is adapted to drive a link 35 through a first gear train 36, the upper extremity of said link being pivotally connected at 38 to the center of the diaphragm 28. Therefore, when the motor 30 is energized, a series of rapid, sinusoidal pulsations is imparted to the diaphragm 28 and series of correspondingly rapid, sinusoidal pressure waves generated in the body of liquid 22.

A second gear train 40 is connected to a second link 42 which is pivotally secured at its upper extremity to the interior of the housing 16. Therefore, as the second gear train 40 is energized concomitantly with the first gear train 36, the link 42 tends to raise and lower the elongated arm or carriage 32, thus bodily shifting the entire first gear train 36 up and down to impart a very gradual second series of pulsations to the diaphragm 28 which is, in turn, communicated to the body of liquid 22 within the receptacle 20.

Thus, the diaphragm 28 and the electric motor 30, the first gear train 36 and first link 35 and the second gear train 40 and the second link 42 constitute means whereby pressure waves may be generated in the body of liquid 22 within the receptacle 20. In addition, the first gear train and associated link, 36 and 35 respectively, constitute means whereby the first series of pulses or pressure waves, denominated "propulsion" pressure waves or pulses, is generated, while the second gear train 40 and second link 42 constitute the means whereby the second series of pressure waves, denominated "vertical" pressure waves or pulses, is generated.

The submerged object 14 which is utilized to illustrate the teachings of my invention is constituted by a fishlike body 46 formed from rubber, plastic, or other flexible or compressible material, said body incorporating a mouth 48, gills 50, and a propulsive appendage 52 constituted by the tail of the body. Decorative fins 54 are also supplied on the upper and lower edges of the body 46.

The body 46 is hollow and there is incorporated therein appendage actuating means 56, said appendage actuating means including a spring element 58 formed from Phosphor bronze or beryllium copper and being substantially ovoid in configuration. The opposite sides of the spring element are connected by superimposed arms 60 mounted on pivot pins 62 and the rear end of the spring element is spot welded or otherwise joined together as at 64.

In order to rigidify the body 46, a vertical frame member constituted by a relatively rigid wire 68 of ovoid configuration is located in the body and serves to resist the compression of the body 46 in a vertical direction. It will be noted that the juxtaposed extremities of the wires 68 are joined in a rubber block 72 which is located adjacent the tail 52 of the body 46. It will be noted that the tail 52 of the body 46 is bent into the position shown in FIG. 7 of the drawing by the action of the spring actuating means 56. It will be noted that the portion of the spring element 58 in the forward extremity or nose of the body 46 is considerably stronger and has a higher spring rate than the portion of the spring element 58 in the tail. Therefore, the action of the nose portion of the spring element 58 serves to bend the tail to the position shown in FIG. 7 of the drawing.

The body 46 can be ballasted with a weight 74 so that the body displaces approximately the same over-all weight of water as its total ballasted weight.

When the body 46 of the submersible object 14 is placed in the liquid 22 and the electric motor energized, the first propulsion waves indicated at 76 in the diagram of FIG. 8 will collapse the body in a horizontal direction only because of the larger areas on the sides of the body 46 and because of the resistance of the body to vertical compression which is attributable to the rigidifying action of the wire frame 68. As the body 46 or, more particularly, the sides thereof is collapsed, the opposite sides of the spring element 58 are urged toward each other, forcing the arms 60 to pivot and thus causing lateral shift of the opposite side of the spring element 58. In this manner, the position of the tail 52 is reversed since the spring element 58 is shortened on one side and lengthened on the other. Therefore, the tail moves in a realistic arc.

As the sides of the spring element 58 collapse toward each other, it tends to increase in length putting tension on the rubber jaws 48 and causing them to open. Since the gills 50 remain in the position in which they are formed because of the equal pressure on the opposite sides thereof, the collapsing sides create an illusion of gill movement.

Simultaneously with the subjection of the body 46 to the rapid pulses or propulsion pressure waves, the body is subjected through the liquid 22 to a vertical pressure wave indicated at 80 in FIG. 9 of the drawing which, by gradually and slowly increasing the pressure of the liquid 22, causes downward movement of the body 46 of the submerged object 14 by gradually reducing the size thereof and thus the displacement thereof and permitting said body to move gradually downwardly. As the link 42 permits the elongated arm 32 to move downwardly, thus reducing the vertical pressure, the displacement of the body 46 increases and the body 46 moves upwardly.

While I have disclosed the principles of the invention as incorporated in a simulated aquarium and simulated aquatic specimens therein, it should be readily apparent to those skilled in the art that the teachings of the invention can be applied with equal cogency to other types of articles.

In addition to the lowering of the submerged body 14 in the liquid 22, the second series of pressure waves will cause the submerged bodies to change their direction of movement. This is attributable to the fact that when the submerged body is subjected to the propulsion signals, the body will turn to the right gradually because the angle A, as best shown in FIG. 7 of the drawing, is greater than the angle B. With the gradual increase in the pressure of the liquid 22 due to the imposition of the vertical pressure signal thereupon, the body 46 will submerge and the angles A and B will reverse with the angle B becoming larger than the angle A, thus causing the fish to turn in a left-hand direction.

I thus provide by my invention a submerged object propulsion system which includes a propulsion apparatus and an object adapted to be propelled thereby. In the case of aquariums it is possible to simulate exceedingly lifelike movements of submerged objects of the form of aquatic specimens and such movement is adequately simulated because of the fact that the specimens appear to be completely self-propelled. This is attributable largely to the fact that, in addition to being propelled lineally, the specimens also move upwardly and downwardly in the liquid in which they are submerged and alter their direction in correspondence with changes in the basic pressure of the liquid.

While I have disclosed the use of a diaphragm as a pressure wave generating device, equivalent structures such as pistons and the like can, of course, be substituted therefor.

I claim:

1. In an apparatus for the propulsion of a submerged body, the combination of: a liquid filled, closed receptacle of transparent material; a compressible submergible body disposed in said receptacle; a propulsive appendage on said body; means in said body responsive to the variations of pressure of the liquid in said receptacle to actuate said appendage; means connected to said receptacle for impressing a series of gradual pressure waves on the liquid; and means for superimposing a series of more rapid pressure waves than said gradual pressure waves on the gradual pressure waves whereby the submersible body will gradually move up and down in response to said gradual pressure waves and said propulsive appendage on said body will be moved by the actuation of said means responsive to the pressure of the liquid as said more rapid pressure waves are imposed thereupon.

2. In an apparatus for the propulsion of a submerged body, the combination of: a liquid filled, closed receptacle of transparent material; a compressible submergible body disposed in said receptacle; a propulsive appendage on said body; means in said body responsive to the variations of pressure of the liquid in said receptacle to actuate said appendage, said responsive means being constituted by a spring actuator located within said body; means connected to said receptacle for impressing a series of gradual pressure waves on the liquid; and means for superimposing a series of more rapid pressure waves than said gradual pressure waves on the gradual pressure waves whereby the submersible body will gradually move up and down in response to said gradual pressure waves and said propulsive appendage on said body will be moved by the actuation of said means responsive to the pressure of the liquid as said more rapid pressure waves are imposed thereupon.

References Cited in the file of this patent

UNITED STATES PATENTS

| | | |
|---|---|---|
| 1,471,885 | Dessau | Oct. 23, 1923 |
| 2,345,243 | Eakin | Mar. 28, 1944 |
| 2,525,232 | McGaughy | Oct. 10, 1950 |
| 2,544,949 | Daniel | Mar. 13, 1951 |